(12) United States Patent
Zhang

(10) Patent No.: US 11,461,503 B2
(45) Date of Patent: Oct. 4, 2022

(54) SERVICE PROCESSING METHOD AND APPARATUS

(71) Applicant: ADVANCED NEW TECHNOLOGIES CO., LTD., Grand Cayman (KY)

(72) Inventor: Peng Zhang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/216,823

(22) Filed: Mar. 30, 2021

(65) Prior Publication Data

US 2021/0216664 A1 Jul. 15, 2021

Related U.S. Application Data

(63) Continuation of application No. PCT/CN2019/111283, filed on Oct. 15, 2019.

(30) Foreign Application Priority Data

Nov. 29, 2018 (CN) .......................... 201811445091.4

(51) Int. Cl.
*G06F 21/64* (2013.01)
*G06F 11/34* (2006.01)
(Continued)

(52) U.S. Cl.
CPC .......... *G06F 21/64* (2013.01); *G06F 11/3438* (2013.01); *G06F 21/44* (2013.01); *G06F 21/6218* (2013.01)

(58) Field of Classification Search
CPC ...... G06F 21/64; G06F 11/3438; G06F 21/44; G06F 21/6218
See application file for complete search history.

(56) References Cited

U.S. PATENT DOCUMENTS 7,592,829 B2   9/2009  Walmsley et al.
7,822,419 B2  10/2010  Chang
(Continued)

FOREIGN PATENT DOCUMENTS

CN   102867166 A    1/2013
CN   106095877 A   11/2016
(Continued)

OTHER PUBLICATIONS

Search Report for Taiwanese Application No. 108132396 dated Jun. 9, 2020.

(Continued)

*Primary Examiner* — Meng Ai T An
*Assistant Examiner* — Willy W Huaracha

(57) ABSTRACT

A method includes: receiving a service participation request of a target service transmitted by a user terminal, wherein the user terminal comprises an iOS operating system; obtaining target identification data from a system server according to the service participation request, wherein the target identification data comprises first identification data used for identifying whether the user terminal participates in the target service, and/or second identification data used for identifying whether the device data of the user terminal is modified, and the system server is a server corresponding to the iOS operating system; and according to the target identification data, determining whether to allow the user terminal to participate in the target service.

15 Claims, 5 Drawing Sheets

(51) Int. Cl.
*G06F 21/44* (2013.01)
*G06F 21/62* (2013.01)

(56) References Cited

U.S. PATENT DOCUMENTS

| | | | |
|---|---|---|---|
| 8,230,118 | B2 | 7/2012 | Toba et al. |
| 8,250,287 | B1 * | 8/2012 | Mirichigni .............. G06F 13/28 |
| | | | 711/103 |
| 8,638,799 | B2 | 1/2014 | Mudigonda et al. |
| 8,717,961 | B2 | 5/2014 | Ryu et al. |
| 8,799,705 | B2 | 8/2014 | Hallak et al. |
| 8,909,956 | B2 | 12/2014 | Zhuang et al. |
| 8,976,649 | B2 | 3/2015 | Li et al. |
| 9,183,580 | B2 | 11/2015 | Rhoads et al. |
| 9,218,530 | B2 | 12/2015 | Davis et al. |
| 9,549,023 | B2 | 1/2017 | Ridges et al. |
| 9,648,197 | B2 | 5/2017 | Aller |
| 9,830,950 | B2 | 11/2017 | Rodriguez et al. |
| 9,886,210 | B2 | 2/2018 | Frank et al. |
| 9,965,770 | B2 | 5/2018 | Mason-Gugenheim et al. |
| 10,020,958 | B2 | 7/2018 | Lieder et al. |
| 10,063,331 | B2 | 8/2018 | Daoura et al. |
| 10,134,096 | B2 * | 11/2018 | Eichstaedt ............. G06Q 50/01 |
| 10,201,006 | B2 | 2/2019 | Sun et al. |
| 10,230,692 | B2 | 3/2019 | Quigley et al. |
| 10,437,733 | B2 | 10/2019 | Zmudzinski |
| 10,599,637 | B2 | 3/2020 | Marcotte |
| 10,642,364 | B2 | 5/2020 | Minnen |
| 2004/0107217 | A1 * | 6/2004 | Hastings ............. G06F 11/3644 |
| 2005/0111468 | A1 * | 5/2005 | Kuz ........................ H04L 63/10 |
| | | | 370/401 |
| 2013/0282810 | A1 | 10/2013 | Lessin et al. |
| 2014/0351052 | A1 * | 11/2014 | Khalsa ............... G06Q 30/0269 |
| | | | 705/14.58 |
| 2015/0207893 | A1 * | 7/2015 | Lee .................... H04L 12/1859 |
| | | | 709/206 |
| 2017/0106290 | A1 * | 4/2017 | Pierce ................... A63F 13/792 |
| 2018/0253769 | A1 * | 9/2018 | Ye ....................... G06Q 30/0207 |
| 2018/0262388 | A1 | 9/2018 | Johnson et al. |

FOREIGN PATENT DOCUMENTS

| | | | |
|---|---|---|---|
| CN | 106846058 | A * | 6/2017 |
| CN | 106846058 | A | 6/2017 |
| CN | 107766432 | A | 3/2018 |
| CN | 107767151 | A | 3/2018 |
| CN | 107872491 | A | 4/2018 |
| CN | 108122128 | A | 6/2018 |
| CN | 108171519 | A | 6/2018 |
| CN | 108280675 | A | 7/2018 |
| CN | 108470298 | A | 8/2018 |
| CN | 108537598 | A | 9/2018 |
| CN | 109615423 | A | 4/2019 |
| TW | M567426 | U | 9/2018 |
| TW | M567428 | U | 9/2018 |
| WO | 2014015434 | A1 | 1/2014 |

OTHER PUBLICATIONS

First Search for Chinese Application No. 201811445091.4 dated Mar. 12, 2020.
Supplementary Search for Chinese Application No. 201811445091.4 dated May 13, 2020.
Written Opinion and International Search Report for PCT Application No. PCT/CN2019/111283 dated Jan. 15, 2020.
International Preliminary Report on Patentability Chapter 1 for PCT Application No. PCT/CN2019/111283 dated Jun. 10, 2021.
Supplementary European Search Report for Application No. 19891348. 5, dated Nov. 18, 2021, 9 pages.
Device Check, Apple Developer Documentation, Oct. 4, 2081, 2 pages, XP055859763, Retrieved from the Internet URL: https://web.archive.org/web/20181004164 75/ https://developer.apple.com/documentation/devicecheck.
Accessing and Modifying Per-Device Data, Apple Developer Documentation, Oct. 20, 2018, 4 pages, XP055859763, Retrieved from the Internet URL: https://web.archive.org/web/20181020134209mp_/ https://developer.apple.com/documentation/devicecheck/accessingandmodifying_per-device_data.

* cited by examiner

_US 11,461,503 B2_

SERVICE PROCESSING METHOD AND APPARATUS

CROSS REFERENCE TO RELATED APPLICATIONS

This application is a continuation application of International Application No. PCT/CN2019/111283, filed on Oct. 15, 2019, which claims priority to and benefits of Chinese Patent Application No. 201811445091.4 filed on Nov. 29, 2018. The content of the above-referenced applications is incorporated herein by reference in their entirety.

TECHNICAL FIELD

This application relates to the field of Internet technologies, in particular, to a service processing method and apparatus.

BACKGROUND

With the rapid development of information technologies and Internet technologies, online services have been rapidly developed and widely applied. More users handle services on line, for example, performing online shopping and online payment. With the popularity of online services, in order to attract more users, service platforms or merchants often carry out some marketing activities, for example, issuing red packets or coupons to users.

Some marketing activity rules are generally set for the marketing activities carried out by the service platforms or the merchants. For example, one terminal device can participate in the marketing activities only once. However, in a practical operation, there are always some users who evade the restriction of the marketing activity rules by modifying terminal devices or the like, resulting in loss of marketing assets.

Therefore, how to identify whether a terminal device is allowed to participate in a marketing activity when the terminal device is to participate in the marketing activity is a technical problem urgently to be resolved currently.

SUMMARY

An objective of embodiments of this specification is to provide a service processing method and apparatus. After a service participation request transmitted by a user terminal for a target service is received, target identification data that can identify whether the user terminal has participated in the target service and/or whether device data of the user terminal is modified is obtained from a system server, to determine, according to the target identification data, whether to allow the user terminal to participate in the target service. The user terminal includes an iOS operating system. In the embodiments of this specification, whether the device data of the user terminal is modified and/or whether the user terminal has participated in the target service may be accurately determined through the target identification data to accurately determine whether to allow the user terminal to participate in the target service, since the target identification data stored on the system server is not modified even if the device data of the user terminal is modified. Loss of assets of the target service caused by the same user terminal repeatedly participating in the target service by cheating in device modification or other manners is avoided.

To resolve the foregoing technical problem, the embodiments of this specification are implemented as follows.

The embodiments of this specification provide a service processing method, including: receiving a service participation request transmitted by a user terminal for a target service, where the user terminal includes an iOS operating system; obtaining target identification data from a system server according to the service participation request, where the target identification data includes first identification data used for identifying whether the user terminal has participated in the target service, and/or second identification data used for identifying whether device data of the user terminal is modified, and the system server is a server corresponding to the iOS operating system; and determining, according to the target identification data, whether to allow the user terminal to participate in the target service.

The embodiments of this specification further provide a service processing apparatus, including: a receiving module configured to receive a service participation request transmitted by a user terminal for a target service, where the user terminal includes an iOS operating system; an obtaining module configured to obtain target identification data from a system server according to the service participation request, where the target identification data includes first identification data used for identifying whether the user terminal has participated in the target service, and/or second identification data used for identifying whether device data of the user terminal is modified, and the system server is a server corresponding to the iOS operating system; and a first determining module configured to determine, according to the target identification data, whether to allow the user terminal to participate in the target service.

The embodiments of this specification further provide a service processing device, including: a processor; and a memory arranged to store computer-executable instructions, where the executable instructions, when executed, cause the processor to perform operations including: receiving a service participation request transmitted by a user terminal for a target service, where the user terminal includes an iOS operating system; obtain target identification data from a system server according to the service participation request, where the target identification data includes first identification data used for identifying whether the user terminal has participated in the target service, and/or second identification data used for identifying whether device data of the user terminal is modified, and the system server is a server corresponding to the operating system of the user terminal; and determine, according to the target identification data, whether to allow the user terminal to participate in the target service.

The embodiments of this specification further provide a storage medium for storing computer-executable instructions, where when the executable instructions are executed, the following operations are implemented: receiving a service participation request transmitted by a user terminal for a target service, where the user terminal includes an iOS operating system; obtain target identification data from a system server according to the service participation request, where the target identification data includes first identification data used for identifying whether the user terminal has participated in the target service, and/or second identification data used for identifying whether device data of the user terminal is modified, and the system server is a server corresponding to the operating system of the user terminal; and determine, according to the target identification data, whether to allow the user terminal to participate in the target service.

The embodiments of this specification further provide a service processing method. The service processing method includes: receiving, by a computer device, a service participation request transmitted by a user terminal for a target service, wherein the user terminal comprises an iOS operating system; obtaining, by the computer device, target identification data from a system server according to the service participation request, wherein the target identification data comprises first identification data indicating whether the user terminal has participated in the target service, and/or second identification data indicating whether device data of the user terminal has been modified, wherein the system server corresponds to the iOS operating system; and determining, by the computer device, whether the first identification data is a first specified value and whether the second identification data is a second specified value, wherein the first specified value indicates that the user terminal has participated in the target service, and the second specified value indicates that the device data of the user terminal has been modified; in response to determining that the first identification data is the first specified value and/or the second identification data is the second specified value, denying, by the computer device, the service participation request to prohibit the user terminal to participate in the target service; and in response to determining that the first identification data is not the first specified value and the second identification data is not the second specified value, granting, by the computer device, the service participation request to allow the user terminal to participate in the target service.

The embodiments of this specification further provide an apparatus. The apparatus includes one or more processors, and a memory communicatively connected to the one or more processors, wherein the memory stores instructions executable by the one or more processors to cause the one or more processors to perform operations including: receiving, a service participation request transmitted by a user terminal for a target service, wherein the user terminal comprises an iOS operating system; obtaining target identification data from a system server according to the service participation request, wherein the target identification data comprises first identification data indicating whether the user terminal has participated in the target service, and/or second identification data indicating whether device data of the user terminal has been modified, wherein the system server corresponds to the iOS operating system; and determining whether the first identification data is a first specified value and whether the second identification data is a second specified value, wherein the first specified value indicates that the user terminal has participated in the target service, and the second specified value indicates that the device data of the user terminal has been modified; in response to determining that the first identification data is the first specified value and/or the second identification data is the second specified value, denying the service participation request to prohibit the user terminal to participate in the target service; and in response to determining that the first identification data is not the first specified value and the second identification data is not the second specified value, granting the service participation request to allow the user terminal to participate in the target service.

One or more non-transitory computer-readable storage media storing instructions which, when executed by one or more processors, cause the one or more processors to perform operations including: receiving, a service participation request transmitted by a user terminal for a target service, wherein the user terminal comprises an iOS operating system; obtaining target identification data from a system server according to the service participation request, wherein the target identification data comprises first identification data indicating whether the user terminal has participated in the target service, and/or second identification data indicating whether device data of the user terminal has been modified, wherein the system server corresponds to the iOS operating system; and determining whether the first identification data is a first specified value and whether the second identification data is a second specified value, wherein the first specified value indicates that the user terminal has participated in the target service, and the second specified value indicates that the device data of the user terminal has been modified; in response to determining that the first identification data is the first specified value and/or the second identification data is the second specified value, denying the service participation request to prohibit the user terminal to participate in the target service; and in response to determining that the first identification data is not the first specified value and the second identification data is not the second specified value, granting the service participation request to allow the user terminal to participate in the target service.

In the technical solutions in the embodiments, after a service participation request transmitted by a user terminal for a target service is received, target identification data that can identify whether the user terminal has participated in the target service and/or whether device data of the user terminal is modified is obtained from a system server, to determine, according to the target identification data, whether to allow the user terminal to participate in the target service. The user terminal includes an iOS operating system. In the embodiments of this specification, whether the device data of the user terminal is modified and/or whether the user terminal has participated in the target service may be accurately determined through the target identification data to accurately determine whether to allow the user terminal to participate in the target service, since the target identification data stored on the system server is not modified even if the device data of the user terminal is modified. Loss of assets of the target service caused by the same user terminal repeatedly participating in the target service by cheating in device modification or other manners is avoided.

BRIEF DESCRIPTION OF THE DRAWINGS

To describe the technical solutions in the embodiments of this specification or in existing technologies more clearly, the following briefly introduces the accompanying drawings required for describing the embodiments or the existing technologies. Apparently, the accompanying drawings in the following description show merely some embodiments of this specification, and a person of ordinary skill in the art may still derive other drawings from these accompanying drawings without creative efforts.

DETAILED DESCRIPTION

To enable a person skilled in the art to better understand the technical solutions in this specification, the technical solutions of the embodiments of this specification will be described clearly and thoroughly below with reference to the accompanying drawings of the embodiments of this specification. Apparently, the described embodiments are merely some rather than all of the embodiments of this specification. All other embodiments obtained by a person of ordinary skill in the art based on the embodiments of this specification without creative efforts shall fall within the protection scope of this specification.

The embodiments of this specification provide a service processing method. The method is mainly used for processing a service participation request transmitted by a user terminal with an iOS operating system installed. The method provided in the embodiments of this specification is applicable to a server corresponding to an application (APP) on the user terminal with the iOS operating system installed. In other words, an execution body of the method is a server corresponding to an APP, for example, may be a service processing apparatus installed on the server. The user terminal may be a mobile phone, a tablet computer, a computer, or the like. It should be noted that, the user terminals described in the embodiments of this specification are user terminals having the iOS operating system.

For ease of understanding, the execution body of the method provided in the embodiments of this specification is described with examples.

For example, an APP 1 and an APP 2 are installed on a user terminal. If a service participation request for a target service is transmitted by the APP 1 installed on the user terminal, the execution body of the method is a computer device (e.g., a server) corresponding to the APP 1. If the service participation request for the target service is transmitted by the APP 2 installed on the user terminal, the execution body of the method is a computer device (e.g., a server) corresponding to the APP 2.

Figure 1:
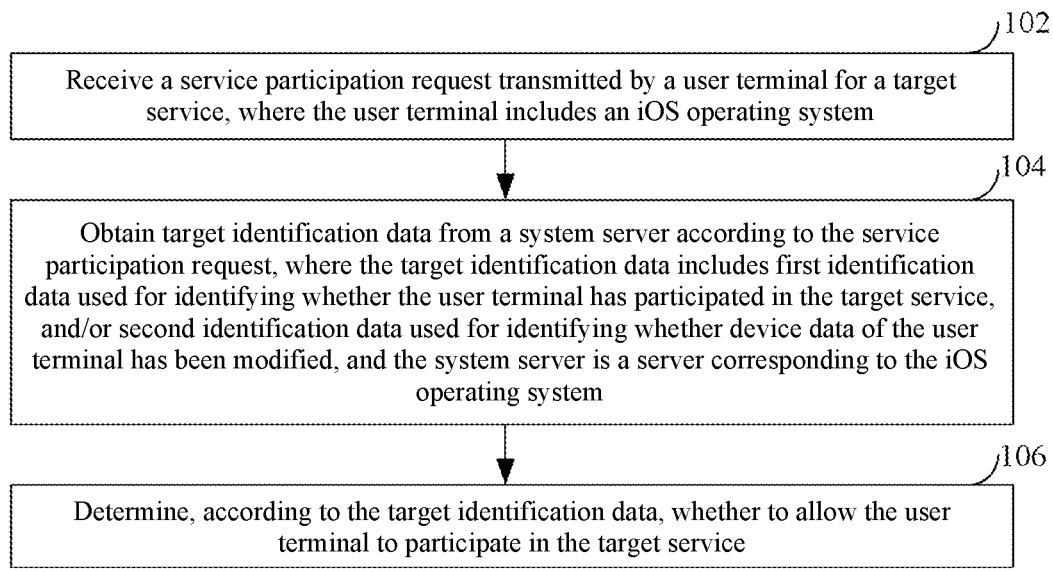
FIG. 1 is a flowchart of a service processing method, according to an embodiment of this specification.

FIG. 1 is a flowchart of a service processing method, according to an embodiment of this specification. The method shown in FIG. 1 includes at least the following steps.

Step 102. Receiving a service participation request transmitted by a user terminal for a target service, where the user terminal includes an iOS operating system.

The target service may be a marketing activity carried out by a service platform or a merchant. For example, the marketing activity may be issuing coupons, red packets, discount cards, or discount vouchers. Correspondingly, the user may transmit a participation request for the marketing activity to an APP server by using an APP client installed on the user terminal.

Step 104. Obtaining target identification data from a system server according to the service participation request, where the target identification data includes first identification data used for identifying whether the user terminal has participated in the target service, and/or second identification data used for identifying whether device data of the user terminal is modified, and the system server is a server corresponding to the iOS operating system.

The device data of the user terminal may include software information, hardware information, downloaded APPs, and other data of the user terminal.

For user terminals with the iOS operating system installed, the iOS operating system reserves two bits for each user terminal. APPs installed on the user terminal may write, update, and read values corresponding to the bits, and the values corresponding to the bits do not change when terminal data of the user terminal is modified. Therefore, during specific implementation, the APPs may use the bits to tag some services. In this embodiment of this specification, two bits of the user terminal are used to identify whether the user terminal has participated in the target service and/or whether the device data of the user terminal is modified. Therefore, the target identification data may be a value of a target bit, and the value of the target bit includes a value of a first bit used for identifying whether the user terminal has participated in the target service, and/or a value of a second bit used for identifying whether the device data of the user terminal is modified.

During specific implementation, the APPs may use either or both of the two bits of the user terminal.

It should be noted that, the target identification data may include only the first identification data used for identifying whether the user terminal has participated in the target service; the foregoing target identification data may include only the second identification data used for identifying whether the device data of the user terminal is modified; or the target identification data includes both the first identification data and the second identification data. Correspondingly, if the target identification data includes only the first identification data or the second identification data, it indicates that the APP uses only one bit of the user terminal; if the target identification data includes both the first identification data and the second identification data, it indicates that the APP uses the two bits of the user terminal.

Step 106. Determining, according to the target identification data, whether to allow the user terminal to participate in the target service.

For example, in this embodiment of this specification, if the target identification data indicates that the user terminal has participated in the target service or the device data of the user terminal is modified, the user terminal is not allowed to participate in the target service.

According to the service processing method provided in this embodiment of this specification, whether the user terminal has participated in the target service and/or whether the device data of the user terminal is modified may be identified by using the two bits reserved by the iOS operating system for the user terminal. The values corresponding to the bits cannot be tampered with, so that whether to allow the user terminal to participate in the target service may be determined conveniently and accurately.

For ease of understanding the service processing method provided in this embodiment of this specification, specific implementation processes of the foregoing steps are described in detail below.

In step 104, the obtaining target identification data from a system server according to the service participation request includes the following step 1 and step 2:

Step 1. Obtaining a passage certificate of the system server, where the passage certificate is used for exchanging with the system server for data, and the passage certificate is valid in a set duration.

Step 2. Obtaining the target identification data from the system server based on the passage certificate and the service participation request.

In this embodiment of this specification, the passage certificate may be understood as a temporary token, a key, or the like for exchanging with the system server for data. The passage certificate is a temporary passage certificate, and is valid only in a period of time. For example, during specific implementation, a validity period of the passage certificate may be predetermined as 1 minute, a half minute, or any other time period. This is only for an illustrative description, and does not constitute a limitation to a specific duration corresponding to the validity period of the passage certificate in this embodiment of this specification.

The system server corresponding to the iOS operating system provides an open interface service, for example, a device check interface. A user terminal with the iOS operating system installed may transmit a data query request or write data to the system server through the device check interface.

Therefore, in step 1, the obtaining a passage certificate of the system server includes: transmitting an obtaining request for the passage certificate to the system server through the device check interface; and receiving the passage certificate that is returned by the system server through the device check interface.

In this embodiment of this specification, after receiving the service participation request transmitted by the user terminal, an APP server transmits an obtaining request for a passage certificate to the system server through the device check interface. After receiving the request transmitted by the APP server, the system server delivers a passage certificate (for example, a token) to the APP server through the device check interface.

After the APP server receives the passage certificate transmitted by the system server, step 2 is performed to obtain the target identification data from the system server.

During specific implementation, to facilitate finding target identification data corresponding to the APP, the service participation request carries an identifier of the user terminal and an identifier of an APP corresponding to the target service. Correspondingly, in step 2, the obtaining the target identification data from the system server based on the passage certificate and the service participation request includes:

transmitting a data obtaining request to the system server, where the data obtaining request carries the passage certificate, the identifier of the user terminal, and the identifier of the APP; and receiving the target identification data that is corresponding to the identifier of the user terminal and the identifier of the APP and returned by the system server.

During specific implementation, a plurality of APPs installed on the user terminal may use the bit. Therefore, a value corresponding to the bit varies with different APPs. Therefore, to facilitate accurately obtaining target identification data corresponding to an APP, the data obtaining request transmitted to the system server needs to carry an identifier of the APP. The system server stores target identification data corresponding to each APP on each user terminal. That is, the system server stores identifiers of user terminals, identifiers of the APPs, and target identification data in a one-to-one correspondence manner. A possible storage form is shown in Table 1.

TABLE 1

| Identifier of user terminal | Identifier of APP | Target identification data |
|---|---|---|
| Terminal 1 | APP 1 | Value of bit 1, value of bit 2 |
| Terminal 1 | APP 2 | Value of bit 1, value of bit 2 |
| Terminal 2 | APP 3 | Value of bit 1, value of bit 2 |

In the foregoing Table 1, the target identification data includes values corresponding to two bits: a value of bit 1 and a value of bit 2. Certainly, during specific implementation, the target identification data may alternatively include a value of only one bit. Table 1 is only for an illustrative description, and does not constitute a limitation to this embodiment of this specification.

In this embodiment of this specification, after receiving the data obtaining request transmitted by the APP server, the system server first detects whether the data obtaining request carries a passage certificate; verifies, according to the passage certificate, whether the APP server has permission to obtain data; searches, if the APP server is determined to have permission to obtain data, for corresponding target identification data according to the identifier of the user terminal and the identifier of the APP that are carried in the request; and returns the found target identification data to the APP server.

For ease of understanding, an example is given below for description.

For example, a user participates in a target service through an APP 1 installed on a user terminal 1, that is, transmits a service participation request to a server corresponding to the APP 1 through the user terminal 1. After receiving the service participation request, the server corresponding to the APP 1 obtains a temporary passage certificate from the system server, and transmits an obtaining request for target identification data to the system server. The obtaining request for the target identification data carries the temporary passage certificate, an identifier of the user terminal 1, and an identifier of the APP 1. The system server searches for target identification data corresponding to the identifier of the user terminal 1 and the identifier of the APP 1, and returns the found target identification data to the server of the APP 1.

In addition, during specific implementation, the target identification data includes the first identification data and the second identification data. Correspondingly, in step 106, the determining, according to the target identification data, whether to allow the user terminal to participate in the target service includes the following step (1) and step (2):

Step (1). Determining whether the first identification data is a first specified value, and determining whether the second identification data is a second specified value, where the first specified value indicates that the user terminal has participated in the target service, and the second specified value indicates that the device data of the user terminal is modified.

Step (2). If a determining result indicates that the first identification data is the first specified value and/or the second identification data is the second specified value, denying the user terminal from participating in the target service; otherwise, allowing the user terminal to participate in the target service.

In this embodiment of this specification, if the first identification data is the first specified value, it indicates that the user terminal has participated in the target service; if the second identification data is the second specified value, it indicates that the device data of the user terminal is modified. During specific implementation, at least in the following three cases, the user terminal is not allowed to participate in the target service: 1. it is determined that the user terminal has participated in the target service, but the device data of the user terminal is not modified (that is, it is determined that the first identification data is the first specified value, but the second identification data is not the second specified value); 2. it is determined that the user terminal has not participated in the target service, but the device data of the user terminal is modified (that is, the first identification data is not the first specified value, but the second identification data is the second specified value); 3. it is determined that the user terminal has participated in the target service, and the device data of the user terminal is modified (that is, it is determined that the first identification data is the first specified value, and the second identification data is the second specified value).

In this embodiments of this specification, if it is determined that the first identification data is not the first specified value, and the second identification data is not the second specified value (that is, it is determined that the user terminal has not participated in the target service, and the device data of the user terminal is not modified), the user terminal is allowed to participate in the target service.

During specific implementation, the first identification data may be a value of bit 1, and the second identification data may be a value of bit 2.

Figure 2:
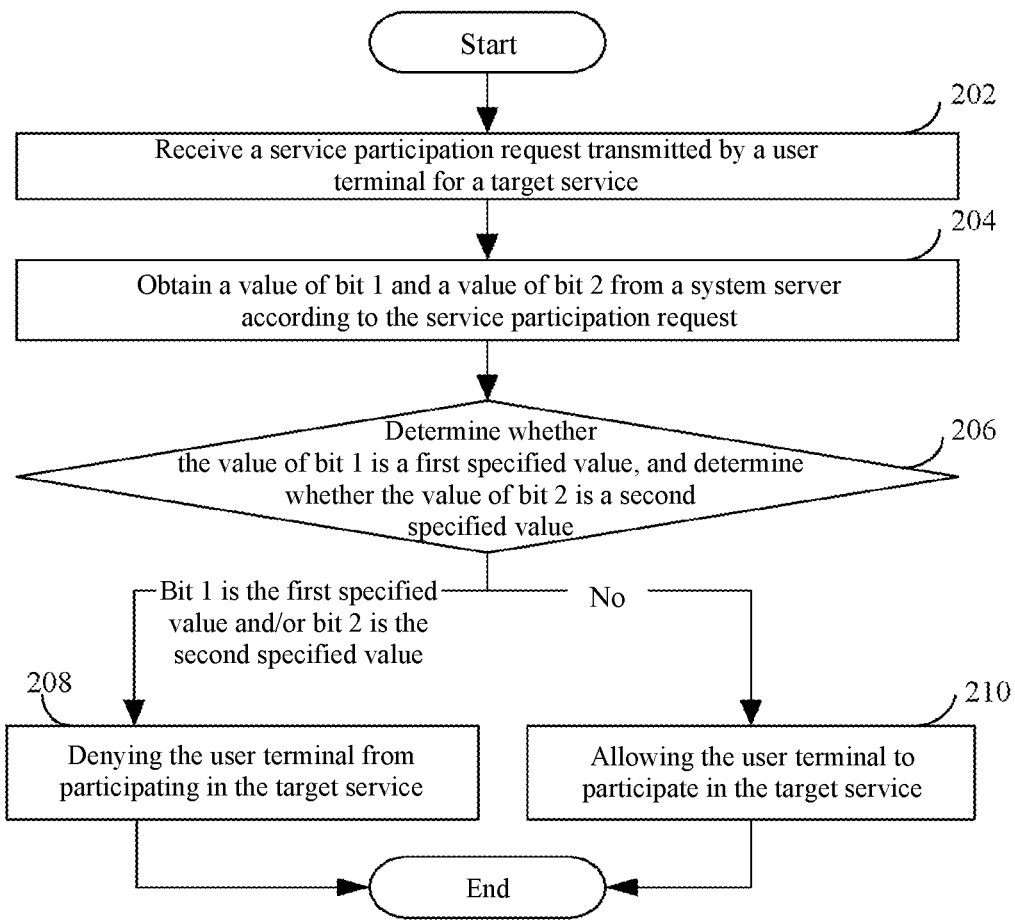
FIG. 2 is a flowchart of a service processing method, according to an embodiment of this specification.

The values of the first specified value and the second specified value may be the same or different. For example, during specific implementation, the first specified value may be set to 1. That is, if it is determined that a value of bit 1 is 1, it is determined that the user terminal has participated in the target service. If it is determined that a value of bit 2 is 1, it is determined that the device data of the user terminal is modified. For example, initial values of bit 1 and bit 2 may be preset, for example, may be zero. When it is detected that the user has participated in the target service, the value of bit 1 is updated to 1; and if it is determined that the device data of the user terminal is modified, the value of bit 2 is updated to 1. For ease of understanding the method provided in this embodiment of this specification, an example in which the first identification data is a value of bit 1, and the second identification data is a value of bit 2 is used for describing the method provided in this embodiment of this specification. FIG. 2 is a flowchart of a service processing method, according to an embodiment of this specification. The method shown in FIG. 2 includes at least the following steps.

Step 202. Receiving a service participation request transmitted by a user terminal for a target service.

Step 204. Obtaining a value of bit 1 and a value of bit 2 from a system server according to the service participation request.

The value of bit 1 is used for identifying whether the user terminal has participated in the target service, and the value of bit 2 is used for identifying whether device data of the user terminal is modified.

Step 206. Determining whether the value of bit 1 is a first specified value, and determining whether the value of bit 2 is a second specified value; and performing step 208 if the value of bit 1 is the first specified value and/or the value of bit 2 is the second specified value; otherwise, performing step 210.

The first specified value indicates that the user terminal has participated in the target service, and the second specified value indicates that the device data of the user terminal is modified.

Step 208. Denying the user terminal from participating in the target service.

Step 210. Allowing the user terminal to participate in the target service.

Certainly, during specific implementation, if the target identification data includes only the first identification data that indicates whether the user terminal has participated in the target service, in step 106, the determining, according to the target identification data, whether to allow the user terminal to participate in the target service includes: determining whether the first identification data is the first specified value, and determining that the user terminal has participated in the target service and the user terminal is not allowed to participate in the target service if the first identification data is the first specified value; or the user terminal is allowed to participate in the target service if the first identification data is not the first specified value. If the target identification data includes only the second identification data that identifies whether the device data of the user terminal is modified, in step 106, the determining, according to the target identification data, whether to allow the user terminal to participate in the target service includes: determining whether the second identification data is the second specified value, and determining that the device data of the user terminal is modified and the user terminal is not allowed to participate in the target service if the second identification data is the second specified value; or determining that the device data of the user terminal is not modified and the user terminal is allowed to participate in the target service if the second identification data is not the second specified value.

Certainly, in this embodiment of this specification, to facilitate determining, according to the target identification data, whether to allow the user terminal to participate in the target service, when it is detected that the user terminal has participated in the target service or the device data of the user terminal is modified, the target identification data corresponding to the user terminal may be written or updated. Therefore, the method provided in this embodiment of this specification further includes:

setting the first identification data to the first specified value when it is determined that the user terminal has participated in the target service; and setting the second identification data to the second specified value when it is determined that the device data of the user terminal is modified.

After receiving the first service participation request transmitted by the user terminal for the target service, the APP server writes the value of bit 1 corresponding to the APP on the user terminal through the device check interface. In this way, when the user terminal requests to participate in the target service again, the value of bit 1 is read through the device check interface, and whether to allow the user terminal to participate in the target service is determined according to the value of bit 1.

After it is identified that the device data of the user terminal is modified, the value of bit 2 corresponding to the APP on the user terminal is written through the device check interface. In this way, when the user terminal requests to participate in the target service again, the value of bit 2 is read through the device check interface, and whether to allow the user terminal to participate in the target service is determined according to the value of bit 2.

Whether the device data of the user terminal is modified may be identified through risk control policies corresponding to other services on the APP.

In addition, in this embodiment of this specification, if it is determined that the first identification data is the first specified value, where the first specified value indicates that the user terminal has participated in the target service, the method provided in this embodiment of this specification further includes the following steps:

detecting whether the device data of the user terminal changes, and determining, according to a detection result, whether the device data of the user terminal is modified.

In some cases, whether the device data of the user terminal is modified may not be identified through other risk control policies, that is, whether the device data of the user terminal is modified cannot be determined according to the second identification data. Alternatively, when the target identification data includes only the first identification data, if the first identification data is the first specified value, it may be considered that the terminal device of the user terminal is modified. Whether the device data of the user terminal is modified is identified by directly detecting whether the device data of the user terminal changes.

During specific implementation, if the first identification data is the first specified value, it indicates that the user terminal has participated in the target service. When the user terminal has participated in the target service, if the participation request transmitted by the user terminal for the target service is received again, it indicates that the user repeatedly requests to participate in the target service by using the user terminal, or the user requests to participate in the target service after the device data of the user terminal is tampered with (for example, is modified by the dark industry). Therefore, in either case, if the first identification data is the first specified value, whether the device data of the user terminal changes is detected. If it is detected that the device data of the user terminal changes, it is considered that the device data of the user terminal is modified. Through this method, whether the device data of the user terminal is modified may be simply determined.

In this embodiment of this specification, after determining that the first identification data is the first specified value, whether the device data of the user terminal is modified may be simply, quickly, and conveniently detected by directly comparing the device data of the user terminal.

In addition, in this embodiment of this specification, in some cases, the target identification data may not be obtained from the system server in the set duration or an error occurs due to network or other reasons. In this case, in order not to affect a processing manner for the target service, in this embodiment of this specification, if the target identification data cannot be obtained in the set duration, the user terminal is allowed to participate in the target service.

During specific implementation, the APP server may be configured to enable or disable an operation of invoking the system server to obtain target identification data. If the target identification data cannot be obtained from the system server in the set duration, the APP server may disable the operation of invoking the system server, and directly allow the user terminal to participate in the target service.

Figure 3:
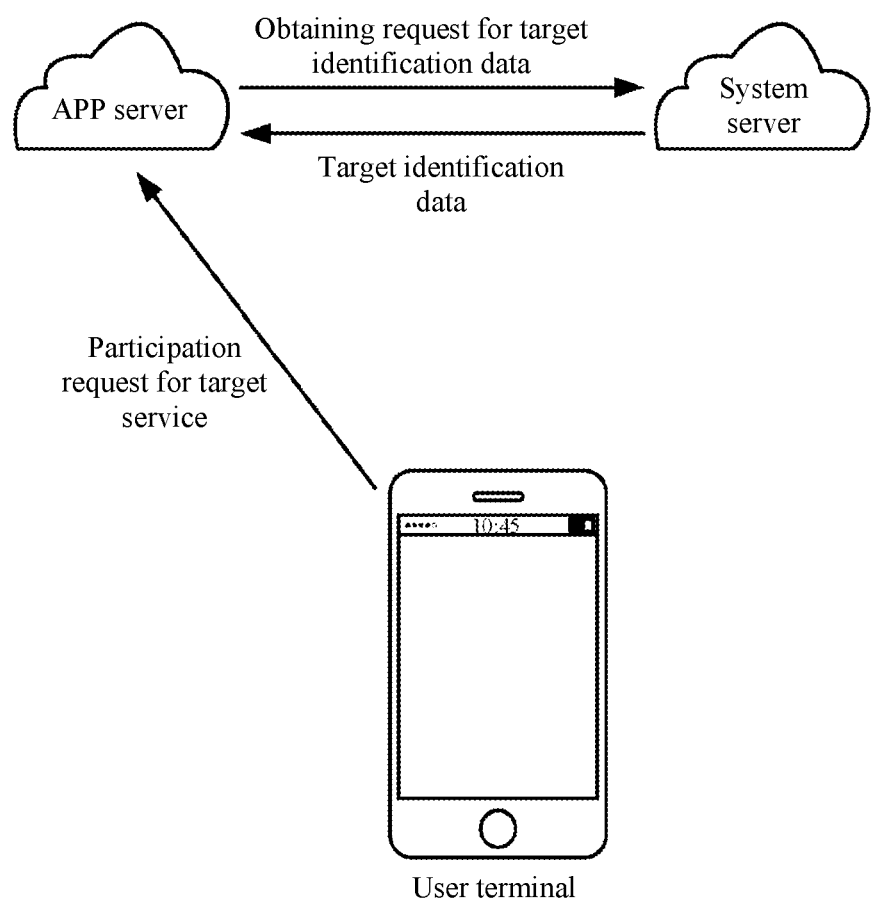
FIG. 3 is a schematic diagram of a system for implementing a service processing method, according to an embodiment of this specification.

FIG. 3 is a schematic diagram of a system for implementing a service processing method, according to an embodiment of this specification. In the scenario shown in FIG. 3, a user terminal transmits a service participation request for a target service to an APP server; after receiving the service participation request transmitted by the user terminal, the APP server transmits an obtaining request for target identification data to a system server; and the system server returns the target identification data to the APP server, for the APP server to determine, according to the target identification data, whether to allow the user terminal to participate in the target service.

Figure 4:
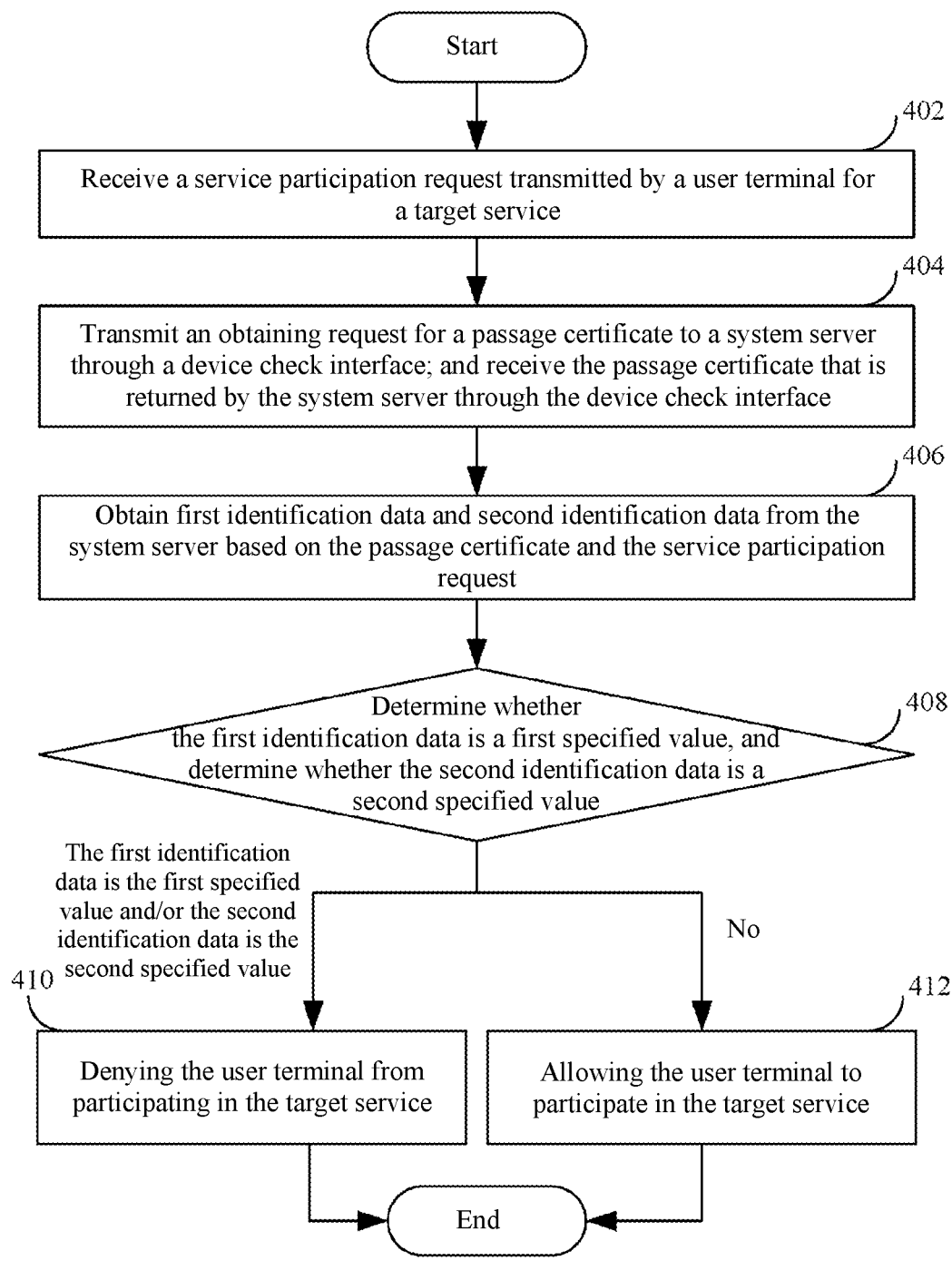
FIG. 4 is a flowchart of a service processing method, according to another embodiment of this specification.

FIG. 4 is a flowchart of a service processing method, according to an embodiment of this specification. The method shown in FIG. 4 includes at least the following steps.

Step 402. Receiving a service participation request transmitted by a user terminal for a target service.

Step 404. Transmitting an obtaining request for a passage certificate to a system server through a device check interface; and receiving the passage certificate that is returned by the system server through the device check interface.

Step 406. Obtaining first identification data and second identification data from the system server based on the passage certificate and the service participation request.

The first identification data is used for indicating whether the user terminal has participated in the target service, and the second identification data is used for indicating whether device data of the user terminal is modified.

Step 408. Determining whether the first identification data is a first specified value, and determining whether the second identification data is a second specified value; and performing step 410 if a determining result indicates that the first identification data is the first specified value and/or the second identification data is the second specified value; otherwise, performing step 412.

Step 410. Denying the user terminal from participating in the target service.

Step 412. Allowing the user terminal to participate in the target service.

Figure 5:
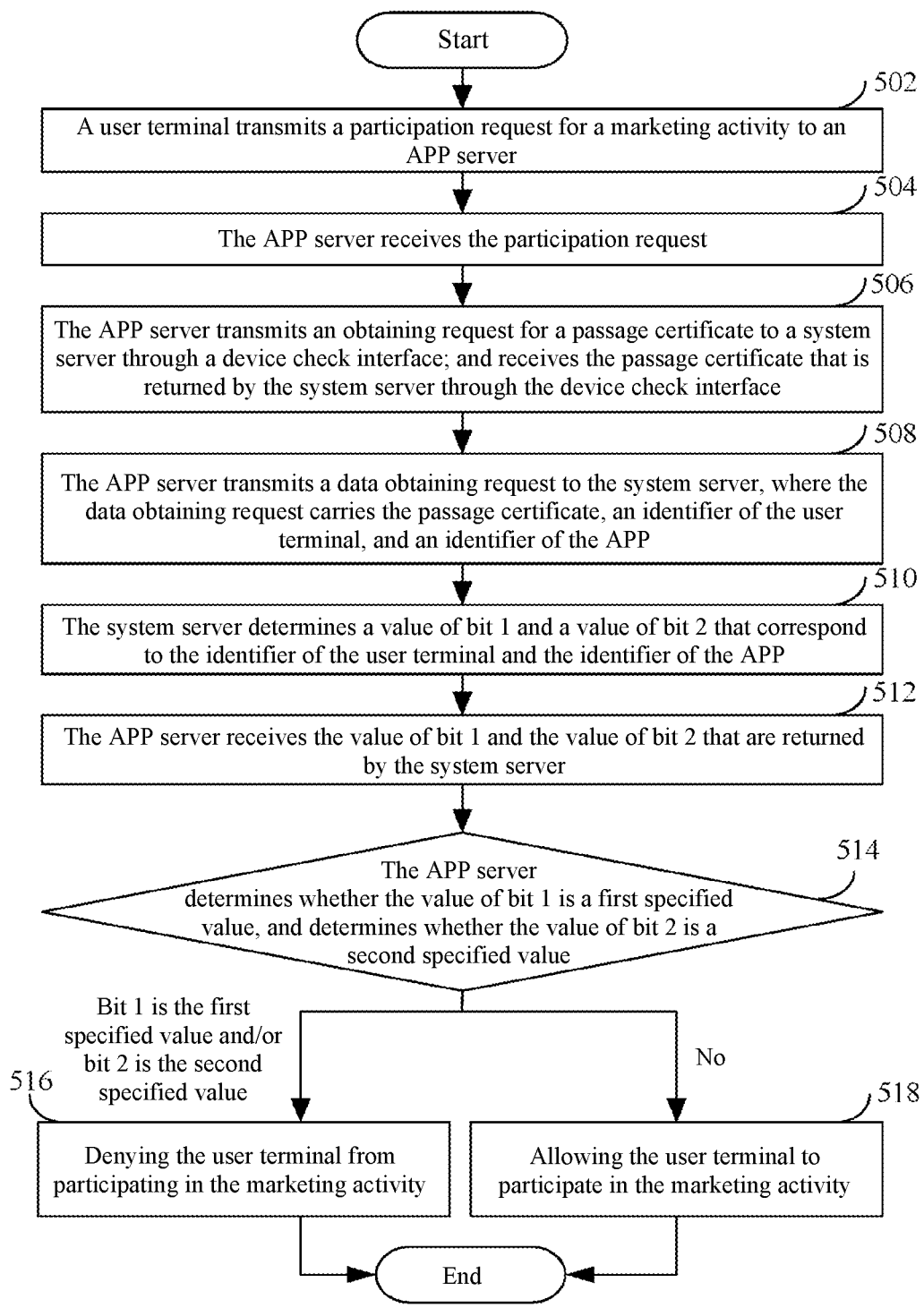
FIG. 5 is a flowchart of a service processing method, according to yet another embodiment of this specification.

During specific implementation, the target service may be a marketing activity, the first identification data may be a value corresponding to bit 1, and the second identification data may be a value corresponding to bit 2. For this case, FIG. 5 is a flowchart of a service processing method, according to an embodiment of this specification. The method shown in FIG. 5 includes at least the following steps.

Step 502. A user terminal transmits a participation request for a marketing activity to an APP server.

Step 504. The APP server receives the participation request.

Step 506. The APP server transmits an obtaining request for a passage certificate to a system server through a device check interface; and receives the passage certificate that is returned by the system server through the device check interface.

Step 508. The APP server transmits a data obtaining request to the system server, where the data obtaining request carries the passage certificate, an identifier of the user terminal, and an identifier of the APP.

Step 510. The system server determines a value of bit 1 and a value of bit 2 that correspond to the identifier of the user terminal and the identifier of the APP.

The value of bit 1 is used for indicating whether the user terminal has participated in the marketing activity, and the value of bit 2 is used for indicating whether device data of the user terminal is modified.

Step 512. The APP server receives the value of bit 1 and the value of bit 2 that are returned by the system server.

Step 514. The APP server determines whether the value of bit 1 is a first specified value, and determines whether the value of bit 2 is a second specified value; and performs step 516 if the value of bit 1 is the first specified value and/or the value of bit 2 is the second specified value; otherwise, performs step 518.

Step 516. Denying the user terminal from participating in the marketing activity.

Step 518. Allowing the user terminal to participate in the marketing activity.

For specific implementation processes of steps in the embodiments corresponding to FIG. 4 and FIG. 5, reference may be made to specific implementation processes of steps in the embodiments corresponding to FIG. 1 and FIG. 2, and details are not described herein again. The methods disclosed herein are performed by computer devices, which in various embodiments may be implemented as one or more servers.

According to the service processing method provided in the embodiments of this specification, after a service participation request transmitted by a user terminal for a target service is received, target identification data that can identify whether the user terminal has participated in the target service and/or whether device data of the user terminal is modified is obtained from a system server, to determine, according to the target identification data, whether to allow the user terminal to participate in the target service. The user terminal includes an iOS operating system. In the embodiments of this specification, whether the device data of the user terminal is modified and/or whether the user terminal has participated in the target service may be accurately determined through the target identification data to accurately determine whether to allow the user terminal to participate in the target service, since the target identification data stored on the system server is not modified even if the device data of the user terminal is modified. Loss of assets of the target service caused by the same user terminal repeatedly participating in the target service by cheating in device modification or other manners is avoided.

Figure 6:
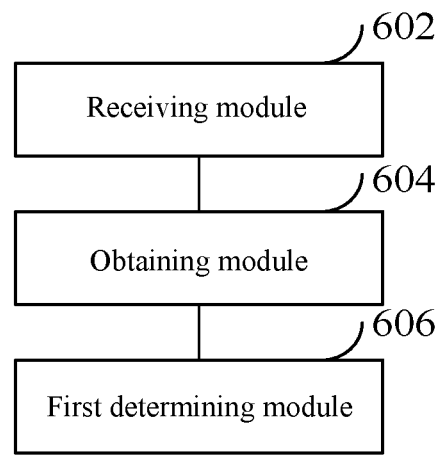
FIG. 6 is a schematic diagram of a service processing apparatus, according to an embodiment of this specification.

Corresponding to the method provided in the embodiments of this specification and based on the same idea, the embodiments of this specification further provide a service processing apparatus, configured to perform the method provided in the embodiments of this specification. FIG. 6 is a schematic diagram of a service processing apparatus, according to an embodiment of this specification. The apparatus shown in FIG. 6 includes:

a receiving module 602, configured to receive a service participation request transmitted by a user terminal for a target service, where the user terminal includes an iOS operating system;

an obtaining module 604, configured to obtain target identification data from a system server according to the service participation request, where the target identification data includes first identification data used for identifying whether the user terminal has participated in the target service, and/or second identification data used for identifying whether device data of the user terminal is modified, and the system server is a server corresponding to the iOS operating system; and a first determining module 606, configured to determine, according to the target identification data, whether to allow the user terminal to participate in the target service.

In some embodiments, the target identification data includes a value of a target bit, and the value of the target bit includes a value of a first bit used for identifying whether the user terminal has participated in the target service, and/or a value of a second bit used for identifying whether the device data of the user terminal is modified.

In some embodiments, the obtaining module 604 includes:

a first obtaining unit, configured to obtain a passage certificate of the system server, where the passage certificate is used for exchanging with the system server for data, and the passage certificate is valid in a set duration; and a second obtaining unit, configured to obtain the target identification data from the system server based on the passage certificate and the service participation request.

In some embodiments, the service participation request carries an identifier of the user terminal and an identifier of an APP corresponding to the target service.

Correspondingly, the second obtaining unit is configured to:

transmit a data obtaining request to the system server, where the data obtaining request carries the passage certificate, the identifier of the user terminal, and the identifier of the APP; and receive the target identification data that is corresponding to the identifier of the user terminal and the identifier of the APP and returned by the system server.

In some embodiments, the target identification data includes the first identification data and the second identification data.

The first determining module 606 includes:

a judgment unit, configured to determine whether the first identification data is a first specified value, and determine whether the second identification data is a second specified value, where the first specified value indicates that the user terminal has participated in the target service, and the second specified value indicates that the device data of the user terminal is modified, and a determining unit, configured to, if a determining result indicates that the first identification data is the first specified value and/or the second identification data is the second specified value, deny the user terminal from participating in the target service; otherwise, allow the user terminal to participate in the target service.

In some embodiments, the apparatus provided in this embodiment of this specification further includes:

a setting module, configured to set a value of the first identification data to the first specified value when it is determined that the user terminal has participated in the target service; and set a value of the second identification data to the second specified value when it is determined that the device data of the user terminal is modified.

In some embodiments, if it is determined that the first identification data is the first specified value, where the first specified value indicates that the user terminal has participated in the target service, the apparatus provided in this embodiment of this specification further includes:

a detection module, configured to detect whether the device data of the user terminal changes; and a second determining module, configured to determine, according to a detection result, whether the device data of the user terminal is modified.

In some embodiments, the first obtaining unit is configured to:

transmit an obtaining request for the passage certificate to the system server through a device check interface; and receive the passage certificate that is returned by the system server through the device check interface.

The service processing apparatus in this embodiment of this specification may further perform the method in FIG. 1 to FIG. 5 performed by the service processing apparatus, and implement functions of the service processing apparatus in the embodiments shown in FIG. 1 to FIG. 5, and details are not repeated herein.

According to the service processing apparatus provided in this embodiment of this specification, after a service participation request transmitted by a user terminal for a target service is received, target identification data that can identify whether the user terminal has participated in the target service and/or whether device data of the user terminal is modified is obtained from a system server, to determine, according to the target identification data, whether to allow the user terminal to participate in the target service. The user terminal includes an iOS operating system. In this embodiment of this specification, whether the device data of the user terminal is modified and/or whether the user terminal has participated in the target service may be accurately determined through the target identification data to accurately determine whether to allow the user terminal to participate in the target service, since the target identification data stored on the system server is not modified even if the device data of the user terminal is modified. Loss of assets of the target service caused by the same user terminal repeatedly participating in the target service by cheating in device modification or other manners is avoided.

Figure 7:
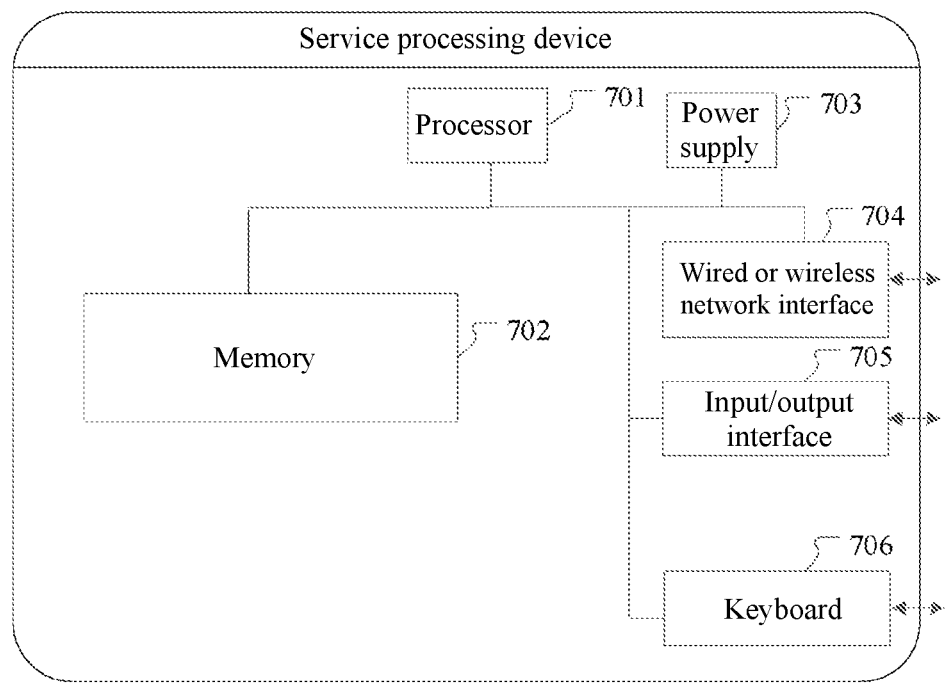
FIG. 7 is a schematic structural diagram of a service processing device, according to an embodiment of this specification.

Further, as shown in FIG. 7, based on the method shown in FIG. 1 to FIG. 5, an embodiment of this specification further provides a service processing device.

The service processing device may vary greatly with different configurations or performance, and may include one or more processors 701 and a memory 702. The memory 702 may store one or more application programs or data. The memory 702 may implement transient storage or persistent storage. The application program stored in the memory 702 may include one or more modules (not shown). Each module may include a series of computer-executable instruction information in the service processing device. Further, the processor 701 may be configured to communicate with the memory 702 to execute, on the service processing device, a series of computer-executable instruction information in the memory 702. The service processing device may further include one or more power supplies 703, one or more wired or wireless network interfaces 704, one or more input/output interfaces 705, one or more keyboards 706, and the like.

In a specific embodiment, the service processing device includes a memory and one or more programs. The one or more programs are stored in the memory, and may include one or more modules. Each module may include a series of computer-executable instruction information in the service processing device. The one or more programs, which are configured to be executed by one or more processors, include the following computer-executable instruction information for:

receiving a service participation request transmitted by a user terminal for a target service, where the user terminal includes an iOS operating system;

obtaining target identification data from a system server according to the service participation request, where the target identification data includes first identification data used for identifying whether the user terminal has participated in the target service, and/or second identification data used for identifying whether device data of the user terminal is modified, and the system server is a server corresponding to the iOS operating system; and determining, according to the target identification data, whether to allow the user terminal to participate in the target service.

In some embodiments, when the computer-executable instruction information is executed, the target identification data includes a value of a target bit, and the value of the target bit includes a value of a first bit used for identifying whether the user terminal has participated in the target service, and/or a value of a second bit used for identifying whether the device data of the user terminal is modified.

In some embodiments, when the computer-executable instruction information is executed, the obtaining target identification data from a system server according to the service participation request includes:

obtaining a passage certificate of the system server, where the passage certificate is used for exchanging with the system server for data, and the passage certificate is valid in a set duration;

obtaining the target identification data from the system server based on the passage certificate and the service participation request.

In some embodiments, when the computer-executable instruction information is executed, the service participation request carries an identifier of the user terminal and an identifier of an APP corresponding to the target service; and the obtaining the target identification data from the system server based on the passage certificate and the service participation request includes:

transmitting a data obtaining request to the system server, where the data obtaining request carries the passage certificate, the identifier of the user terminal, and the identifier of the APP; and receiving the target identification data that is corresponding to the identifier of the user terminal and the identifier of the APP and returned by the system server.

In some embodiments, when the computer-executable instruction information is executed, the target identification data includes the first identification data and the second identification data; and the determining, according to the target identification data, whether to allow the user terminal to participate in the target service includes:

determining whether the first identification data is a first specified value, and determining whether the second identification data is a second specified value, where the first specified value indicates that the user terminal has participated in the target service, and the second specified value indicates that the device data of the user terminal is modified; and if a determining result indicates that the first identification data is the first specified value and/or the second identification data is the second specified value, denying the user terminal from participating in the target service; otherwise, allowing the user terminal to participate in the target service.

In some embodiments, when the computer-executable instruction information is executed, the following steps may be further performed:

setting a value of the first identification data to the first specified value when it is determined that the user terminal has participated in the target service; and setting a value of the second identification data to the second specified value when it is determined that the device data of the user terminal is modified.

In some embodiments, when the computer-executable instruction information is executed, if it is determined that the first identification data is the first specified value, and the first specified value indicates that the user terminal has participated in the target service, the following steps may be further performed:

detecting whether the device data of the user terminal changes, and determining, according to a detection result, whether the device data of the user terminal is modified.

In some embodiments, when the computer-executable instruction information is executed, the obtaining a passage certificate of the system server includes:

transmitting an obtaining request for the passage certificate to the system server through a device check interface; and receiving the passage certificate that is returned by the system server through the device check interface.

According to the service processing device provided in this embodiment of this specification, after a service participation request transmitted by a user terminal for a target service is received, target identification data that can identify whether the user terminal has participated in the target service and/or whether device data of the user terminal is modified is obtained from a system server, to determine, according to the target identification data, whether to allow the user terminal to participate in the target service. The user terminal includes an iOS operating system. In this embodiment of this specification, whether the device data of the user terminal is modified and/or whether the user terminal has participated in the target service may be accurately determined through the target identification data to accurately determine whether to allow the user terminal to participate in the target service, since the target identification data stored on the system server is not modified even if the device data of the user terminal is modified. Loss of assets of the target service caused by the same user terminal repeatedly participating in the target service by cheating in device modification or other manners is avoided.

Further, based on the method shown in FIG. 1 to FIG. 5, an embodiment of this specification further provides a storage medium for storing computer-executable instruction information. In a specific embodiment, the storage medium may be a USB flash drive, an optical disc, a hard disk, or the like. When the computer-executable instruction information stored in the storage medium is executed by a processor, the following procedure can be implemented:

receiving a service participation request transmitted by a user terminal for a target service, where the user terminal includes an iOS operating system;

obtaining target identification data from a system server according to the service participation request, where the target identification data includes first identification data used for identifying whether the user terminal has participated in the target service, and/or second identification data used for identifying whether device data of the user terminal is modified, and the system server is a server corresponding to the iOS operating system; and determining, according to the target identification data, whether to allow the user terminal to participate in the target service.

In some embodiments, when the computer-executable instruction information stored in the storage medium is executed by the processor, the target identification data includes a value of a target bit, and the value of the target bit includes a value of a first bit used for identifying whether the user terminal has participated in the target service, and/or a value of a second bit used for identifying whether the device data of the user terminal is modified.

In some embodiments, when the computer-executable instruction information stored in the storage medium is executed by the processor, the obtaining target identification data from a system server according to the service participation request includes:

obtaining a passage certificate of the system server, where the passage certificate is used for exchanging with the system server for data, and the passage certificate is valid in a set duration;

obtaining the target identification data from the system server based on the passage certificate and the service participation request.

In some embodiments, when the computer-executable instruction information stored in the storage medium is executed by the processor, the service participation request carries an identifier of the user terminal and an identifier of an APP corresponding to the target service; and the obtaining the target identification data from the system server based on the passage certificate and the service participation request includes:

transmitting a data obtaining request to the system server, where the data obtaining request carries the passage certificate, the identifier of the user terminal, and the identifier of the APP; and receiving the target identification data that is corresponding to the identifier of the user terminal and the identifier of the APP and returned by the system server.

In some embodiments, when the computer-executable instruction information stored in the storage medium is executed by the processor, the target identification data includes the first identification data and the second identification data; and the determining, according to the target identification data, whether to allow the user terminal to participate in the target service includes:

determining whether the first identification data is a first specified value, and determining whether the second identification data is a second specified value, where the first specified value indicates that the user terminal has participated in the target service, and the second specified value indicates that the device data of the user terminal is modified; and if a determining result indicates that the first identification data is the first specified value and/or the second identification data is the second specified value, denying the user terminal from participating in the target service; otherwise, allowing the user terminal to participate in the target service.

In some embodiments, when the computer-executable instruction information stored in the storage medium is executed by the processor, the following steps may be further performed:

setting a value of the first identification data to the first specified value when it is determined that the user terminal has participated in the target service; and setting a value of the second identification data to the second specified value when it is determined that the device data of the user terminal is modified.

In some embodiments, when the computer-executable instruction information stored in the storage medium is executed by the processor, if it is determined that the first identification data is the first specified value, and the first specified value indicates that the user terminal has participated in the target service, the following steps may be further performed:

detecting whether the device data of the user terminal changes, and determining, according to a detection result, whether the device data of the user terminal is modified.

In some embodiments, when the computer-executable instruction information stored in the storage medium is executed by the processor, the obtaining a passage certificate of the system server includes:

transmitting an obtaining request for the passage certificate to the system server through a device check interface; and receiving the passage certificate that is returned by the system server through the device check interface.

When the computer-executable instruction information stored in the storage medium provided in this embodiment of this specification is executed by the processor, after a service participation request transmitted by a user terminal for a target service is received, target identification data that can identify whether the user terminal has participated in the target service and/or whether device data of the user terminal is modified is obtained from a system server, to determine, according to the target identification data, whether to allow the user terminal to participate in the target service. The user terminal includes an iOS operating system. In this embodiment of this specification, whether the device data of the user terminal is modified and/or whether the user terminal has participated in the target service may be accurately determined through the target identification data to accurately determine whether to allow the user terminal to participate in the target service, since the target identification data stored on the system server is not modified even if the device data of the user terminal is modified. Loss of assets of the target service caused by the same user terminal repeatedly participating in the target service by cheating in device modification or other manners is avoided.

In the 1990s, improvements of a technology can be clearly distinguished between hardware improvements (for example, improvements to a circuit structure such as a diode, a transistor, or a switch) and software improvements (improvements to a method procedure). However, with the development of technology, improvements of many method procedures can be considered as direct improvements of hardware circuit structures. Almost all program is an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module, or the unit described in the foregoing embodiments can be implemented by a computer chip or an entity, or implemented by a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of this specification, the function of the units may be implemented in the same piece of or multiple pieces of software and/or hardware.

A person skilled in the art should understand that the embodiments of this specification may be provided as a method, a system, or a computer program product. Therefore, of the implementations may include hardware-only embodiments, software-only embodiments, or embodiments combining software and hardware. In addition, the implementations may be in a form of a computer program product that is implemented on one or more computer-usable storage media (including but not limited to a disk memory, a CD-ROM, an optical memory, and the like) that include computer-usable program code.

This specification is described with reference to flowcharts and/or block diagrams of the method, the device (system), and the computer program product according to the embodiments of this specification. It should be understood that computer program instruction information can implement each procedure and/or block in the flowcharts and/or block diagrams, and a combination of procedures and/or blocks in the flowcharts and/or block diagrams. The computer program instruction information may be provided to a general-purpose computer, a dedicated computer, an embedded processor, or a processor of another programmable data processing device to generate a machine, so that the instruction information executed by the computer or the processor of the another programmable data processing device generate an apparatus for implementing a specified function in one or more processes in the flowcharts and/or in one or more blocks in the block diagrams.

The computer program instruction information may also be stored in a computer readable memory that can guide a computer or another programmable data processing device to work in a specified manner, so that the instruction information stored in the computer readable memory generate a product including an instruction information apparatus, where the instruction apparatus implements functions specified in one or more procedures in the flowcharts and/or one or more blocks in the block diagrams.

The computer program instruction information may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPUs), an input/output interface, a network interface, and an internal memory.

The internal memory may include, among computer-readable media, a volatile memory such as a random access memory (RAM) and/or a non-volatile memory such as a read-only memory (ROM) or a flash memory (flash RAM). The internal memory is an example of the computer-readable medium.

The computer-readable medium includes a persistent medium and a non-persistent medium, a removable medium and a non-removable medium, which may implement storage of information by using any method or technology. The information may be a computer-readable instruction information, a data structure, a program module, or other data. Examples of a storage medium of a computer include, but are not limited to, a phase change memory (PRAM), a static random access memory (SRAM), a dynamic random access memory (DRAM), or other types of random access memory (RAM), a read-only memory (ROM), an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. Based on the definition in this specification, the computer-readable medium does not include transitory computer-readable media (transitory media), such as a modulated data signal and a carrier.

It should also be noted that the terms "include," "comprise," and any other variants mean to cover the non-exclusive inclusion. Thereby, the process, method, article, or device that includes a series of elements not only include those elements, but also include other elements not clearly listed, or include the inherent elements of the process, method, article and device. Without further limitation, the element defined by a phrase "include one . . . " does not exclude other same elements in the process, method, article, or device that includes the element.

A person skilled in the art should understand that the embodiments of this specification may be provided as a method, a system, or a computer program product. Therefore, this specification may use a form of hardware-only embodiments, software-only embodiments, or embodiments combining software and hardware. In addition, this specification may use a form of a computer program product that is implemented on one or more computer-usable storage media (including but not limited to a disk memory, a CD-ROM, an optical memory, and the like) that include computer-usable program code.

This specification can be described in the general context of computer-executable instruction information executed by a computer, for example, a program module. Generally, the program module includes a routine, a program, an object, a component, a data structure, and the like for executing a particular task or implementing a particular abstract data type. This specification may also be practiced in distributed computing environments in which tasks are performed by remote processing devices that are connected by using a communication network. In a distributed computing environment, the program module may be located in both local and remote computer storage media including storage devices.

The embodiments of this specification are all described in a progressive manner, for same or similar parts in the embodiments, refer to such embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of this specification, and are not intended to limit this specification. For a person skilled in the art, various modifications and variations can be made to this specification. Any modification, equivalent replacement, or improvement made without departing from the spirit and principle of this specification shall fall within the scope of the claims of this specification.

What is claimed is:

1. A computer-implemented method for processing service participation requests from a user terminal, wherein the user terminal comprises an iOS operating system and an application (APP) associated with a computer device operating as an APP server, the method comprising the steps of:

receiving, by the computer device, a service participation request for a target service transmitted by the user terminal, wherein the service participation request carries an identifier of the user terminal and an identifier of the APP, wherein a system server corresponding to the iOS operating system maintains a table storing target identification data for each APP in each user terminal, and wherein the target identification data for each APP comprises a first reserved bit having a first value and a second reserved bit having a second value;

transmitting, by the computer device, a request for a passage certificate to the system server through a device check interface;

receiving, by the computer device, the passage certificate from the system server, wherein the passage certificate is used for communicating with the system server to obtain target identification data and is valid for a predetermined duration time;

obtaining, by the computer device, target identification data from the system server corresponding to the iOS operating system based on the passage certificate and the service participation request, wherein the target identification data comprises the first value of the first reserved bit indicating whether the user terminal has participated in the target service, and the second value of the second reserved bit indicating whether device data of the user terminal has been modified;

determining, by the computer device, whether the first value is a first specified value and whether the second value is a second specified value, wherein the first specified value indicates that the user terminal has participated in the target service, and the second specified value indicates that the device data of the user terminal has been modified;

in response to determining that the first value is the first specified value and/or the second value is the second specified value, denying, by the computer device, the service participation request to prohibit the user terminal to participate in the target service;

in response to determining that the first value is not the first specified value and the second value is not the second specified value, granting, by computer device, the service participation request to allow the user terminal to participate in the target service, and in response to receiving the service participation request, writing, by the computer device, the first specified value to the first reserved bit to replace the first value.

2. The method of claim 1, wherein the obtaining, by the computer device, the target identification data of the APP of the user terminal from the system server based on the passage certificate and the service participation request comprises:
transmitting, by the computer device, a data obtaining request to the system server, wherein the data obtaining request carries the passage certificate, the identifier of the user terminal, and the identifier of the APP; and
receiving, by the computer device from the system server, the target identification data corresponding to the identifier of the user terminal and the identifier of the APP.

3. The method of claim 1, further comprising:
setting, by the computer device, the second value of the second reserved bit to the second specified value when it is determined that the device data of the user terminal is modified.

4. The method of claim 1, further comprising:
detecting, by the computer device, whether the device data of the user terminal changes, and
in response to detecting that the device data of the user terminal changes, determining, by the computer device, that the device data of the user terminal has been modified.

5. The method of claim 1, wherein the first reserved bit and the second reserved bit are given a first initial value and a second initial value, respectively, when the iOS operating system is installed on the user terminal.

6. An apparatus for processing service participation requests from a user terminal that comprises an iOS operating system and an application (APP) comprising:
one or more processors; and
a memory communicatively connected to the one or more processors, wherein the memory stores instructions executable by the one or more processors to cause the one or more processors to perform operations including:
receiving a service participation request for a target service transmitted by the user terminal, wherein the service participation request carries an identifier of the user terminal and an identifier of the APP, wherein a system server corresponding to the iOS operating system maintains a table storing target identification data for each APP in each user terminal, and wherein the target identification data for each APP comprises a first reserved bit having a first value and a second reserved bit having a second value;
transmitting a request for a passage certificate to the system server through a device check interface;
receiving the passage certificate from the system server, wherein the passage certificate is used for communicating with the system server to obtain target identification data and is valid for a predetermined duration time;
obtaining target identification data from the system server corresponding to the iOS operating system based on the passage certificate and the service participation request, wherein the target identification data comprises the first value of the first reserved bit indicating whether the user terminal has participated in the target service, and the second value of the second reserved bit indicating whether device data of the user terminal has been modified;
determining whether the first value is a first specified value and whether the second value identification data is a value, wherein the first specified value indicates that the user terminal has participated in the target service, and the second specified value indicates that the device data of the user terminal has been modified;
in response to determining that the first value is the first specified value and/or the second value is the second specified value, denying the service participation request to prohibit the user terminal to participate in the target service;
in response to determining that the first value is not the first specified value and the second value is not the second specified value, granting the service participation request to allow the user terminal to participate in the target service; and
in response to receiving the service participation request, writing the first specified value to the first reserved bit to replace the first value.

7. The apparatus of claim 6, wherein the obtaining the target identification data of the APP of the user terminal from the system server based on the passage certificate and the service participation request comprises:
transmitting a data obtaining request to the system server, wherein the data obtaining request carries the passage certificate, the identifier of the user terminal, and the identifier of the APP; and
receiving, from the system server, the target identification data corresponding to the identifier of the user terminal and the identifier of the APP.

8. The apparatus of claim 6, wherein the operations further comprise:
setting the second value of the second reserved bit to the second specified value when it is determined that the device data of the user terminal is modified.

9. The apparatus of claim 6, wherein the operations further comprise:
detecting whether the device data of the user terminal changes, and in response to detecting that the device data of the user terminal changes, determining that the device data of the user terminal has been modified.

10. The apparatus of claim 6, wherein the first reserved bit and the second reserved bit are given a first initial value and a second initial value, respectively, when the iOS operating system is installed on the user terminal.

11. One or more non-transitory computer-readable storage media storing instructions for processing service participation requests from a user terminal that comprises an iOS operating system and an application (APP), wherein the instructions, when executed by one or more processors, cause the one or more processors to perform operations including:
receiving a service participation request for a target service transmitted by the user terminal, the service participation request carries an identifier of the user terminal and an identifier of the APP, wherein a system server corresponding to the iOS operating system maintains a table storing target identification data for each APP in each user terminal, and wherein the target identification data for each APP comprises a first reserved bit having a first value and a second reserved bit having a second value;
transmitting a request for a passage certificate to the system server through a device check interface;
receiving the passage certificate from the system server, wherein the passage certificate is used for communicating with the system server to obtain target identification data and is valid for a predetermined duration time;
obtaining target identification data from the system server corresponding to the iOS operating system based on the passage certificate and the service participation request, wherein the target identification data comprises the first value of the first reserved bit indicating whether the user terminal has participated in the target service, and the second value of the second reserved bit indicating whether device data of the user terminal has been modified;

determining whether the first value is a first specified value and whether the second value is a second specified value, wherein the first specified value indicates that the user terminal has participated in the target service, and the second specified value indicates that the device data of the user terminal has been modified;

in response to determining that the first value is the first specified value and/or the second value is the second specified value, denying the service participation request to prohibit the user terminal to participate in the target service;

in response to determining that the first value is not the first specified value and the second value is not the second specified value, granting the service participation request to allow the user terminal to participate in the target service; and in response to receiving the service participation request, writing the first specified value to the first reserved bit to replace the first value.

12. The one or more non-transitory computer-readable storage media of claim 11, wherein the obtaining the target identification data of the APP of the user terminal from the system server based on the passage certificate and the service participation request comprises:

transmitting a data obtaining request to the system server, wherein the data obtaining request carries the passage certificate, the identifier of the user terminal, and the identifier of the APP; and receiving, from the system server, the target identification data corresponding to the identifier of the user terminal and the identifier of the APP.

13. The one or more non-transitory computer-readable storage media of claim 11, wherein the operations further comprise:

setting the second value of the second reserved bit to the second specified value when it is determined that the device data of the user terminal is modified.

14. The one or more non-transitory computer-readable storage media of claim 11, wherein the operations further comprise:

detecting whether the device data of the user terminal changes, and in response to detecting that the device data of the user terminal changes, determining that the device data of the user terminal has been modified.

15. The one or more non-transitory computer-readable storage media of claim 11, wherein the first reserved bit and the second reserved bit are given a first initial value and a second initial value, respectively, when the iOS operating system is installed on the user terminal.

* * * * *